Oct. 6, 1942.  R. A. GEISELMAN  2,298,120
SPEED MATCHING REGULATOR
Filed April 15, 1941
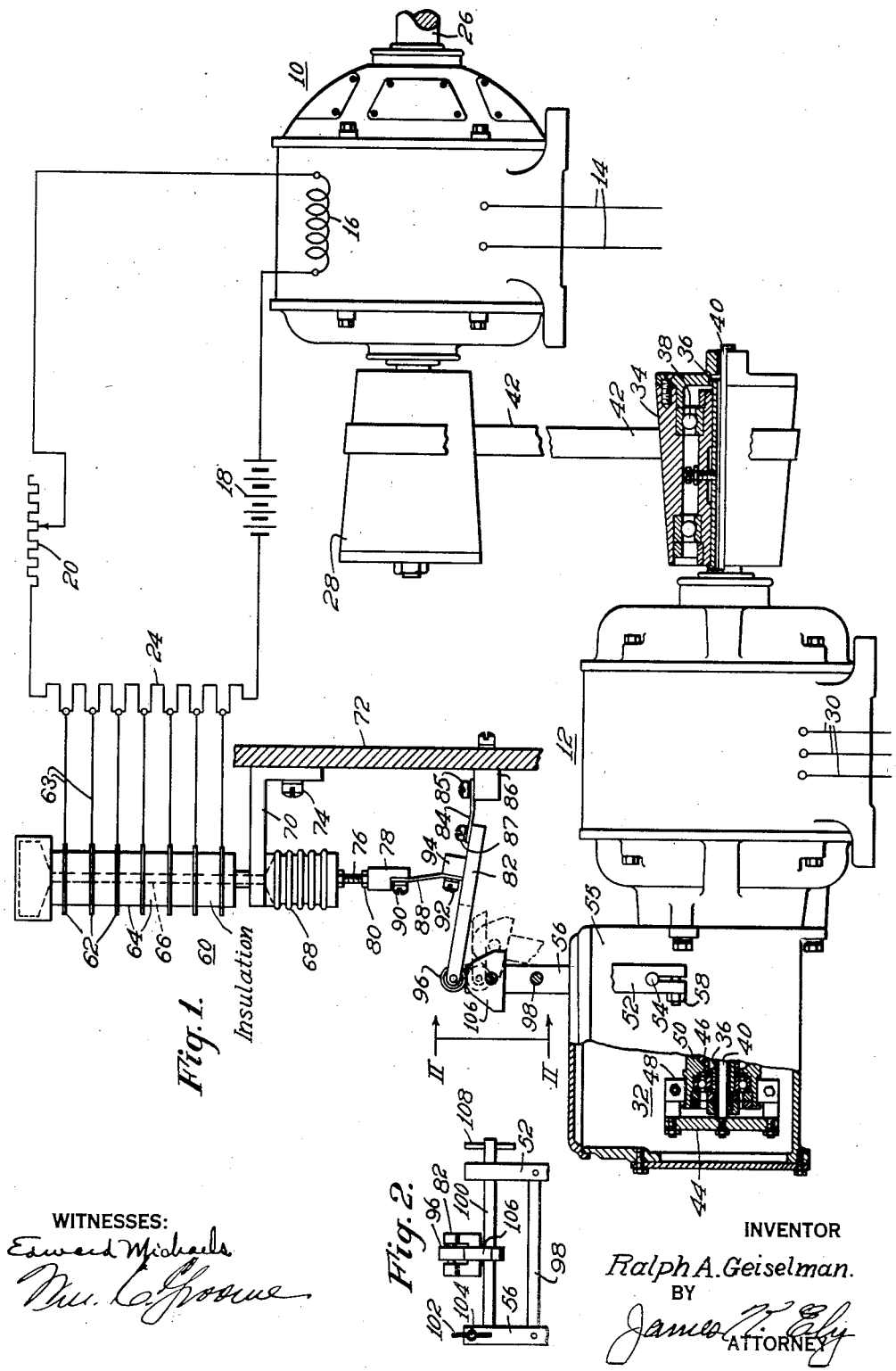
WITNESSES:
Edward Michaels
Wm. L. Groome
INVENTOR
Ralph A. Geiselman.
BY
James T. Ely
ATTORNEY Patented Oct. 6, 1942

2,298,120

UNITED STATES PATENT OFFICE 2,298,120

SPEED MATCHING REGULATOR

Ralph A. Geiselman, Wilkinsburg, Pa., assignor to Westinghouse Electric & Manufacturing Company, East Pittsburgh, Pa., a corporation of Pennsylvania Application April 15, 1941, Serial No. 388,603

6 Claims. (Cl. 172—293)

This invention relates to regulators and particularly to synchronous speed matching regulators.

It is an object of this invention to utilize a mechanical connection movable in response to a change in speed of a dynamo-electric machine for initiating the control of the excitation of the machine and to provide for adjusting the ratio of movement between the moving elements of the connection to give a sensitive direct acting control.

A more specific object of this invention is to utilize a mechanical connection movable in response to a change in speed of a dynamo-electric machine for operating a direct acting control device for controlling the excitation of the machine and to provide for adjusting the ratio of movement between the moving elements of the connection to adjust the sensitivity of response of the control device with respect to the change in speed of the machine.

Other objects of this invention will become apparent from the following description, when taken in conjunction with the accompanying drawing, in which:

Figure 1 is a diagrammatic illustration of the circuits and apparatus illustrating this invention, some of the apparatus being shown in elevation and partly in section; and Fig. 2 is a view in elevation of a portion of the apparatus of Fig. 1 the plane being indicated by the line II—II of Fig. 1.

Referring to the drawing, and particularly Fig. 1, there is illustrated a dynamo-electric machine 10, the speed of which it is desired to maintain constant with respect to a constant speed reference machine 12. The dynamo-electric machine 10 as illustrated comprises a direct current motor having armature windings (not shown) which are disposed to be connected to a source of supply by conductors 14 and a field winding 16. The field winding 16 is connected to be energized from a constant source of direct current, such as the battery 18, through a manually operated rheostat 20 and a variable rheostat 24, as will be explained more fully hereinafter. The shaft 26 of the motor is disposed to drive a load (not shown) and has a cone pulley 28 attached to one of its ends in any suitable manner.

As illustrated, the constant speed reference machine 12 is a direct current motor connected to be supplied from any constant source, not shown, by conductors 30. A mechanical differential connection 32 is also associated with the motor 12 disposed to be driven in accordance with a change in speed between the motors 10 and 12.

As illustrated, a cone pulley 34 is carried on the end of the hollow shaft 36 of the motor 12 as by means of the ball bearings 38, the cone pulley being directly connected to the end of the shaft 40 which extends through the hollow shaft 36 of the motor 12. A suitable belt 42 is so disposed over the cone pulleys 34 and 28 that a desirable ratio between the movements of the pulleys may be obtained and the pulley 34 is driven at a speed relative to the speed of the cone pulley 28, depending upon the ratio between the pulleys.

The shaft 40 to which the cone pulley 34 is attached extends through the motor 12 and is secured to the end plate 44 of the differential connection device 32. The end of the hollow shaft 36 of the motor 12 also functions as a part of the differential device 32 in that it carries a nut 46 suitably keyed thereto as to be disposed for longitudinal movement with respect to the shaft 36. As illustrated, suitable friction shoes 48 are carried about the periphery of the end plate 44 disposed for gripping the end of the worm 50 to effect a movement thereof in response to a movement of the shaft 40. Rotative movement of the worm 50 in response to a difference in speeds between the motors 10 and 12 effects a movement of the nut 46 to cause a movement of the arm 52 about its pivot 54, the connections between the nut 46 and the pivot shaft 54 not being shown as they are well known in the art.

In the particular embodiment of the differential employed for illustrating this invention, arms 52 and 56 extend upwardly from the shaft 54 on opposite sides of the casing or housing 55 of the differential device 32. Each of the arms 52 and 56 are secured to the ends of the shaft 54 in any suitable manner or as illustrated, the ends of the arms 52 and 56 are respectively slotted for fitting over the ends of the shaft 54, a screw 58 being employed for tightening the grip of the slotted ends of the arms on the shaft 54.

The number of sections of the variable resistor 24 which are included in circuit with the field winding 16 of the motor 10 is controlled by the operation of a primary control device 60 which is disposed to be operated in accordance with the movement of the differential device 32. In the particular embodiment illustrated, the primary control device 60 comprises a plurality of alternately stacked elongated conductor members 62 and insulating spacer members 64 provided with aligned openings therein for forming a well 66 which communicates with a bellows 68 which carries a liquid conducting material, such as mercury. In a preferred embodiment the elongated conductor members extend radially outward from the stack to facilitate the making of electrical connections thereto. The alternately stacked conducting members and the insulating spacer members are bonded together to form a leakproof structure, it being found that when the bellows 68 is actuated, the mercury is forced through the well 66 to progressively bridge the conducting members 62.

Each of the conducting members is so connected by a lead 63 to a different tap of the resistor 24 that as the mercury is forced upwardly in the well 66 to progressively bridge the conductor members 62 to progressively shunts sections of the resistor 24 from the field circuit of motor 10. Details of the primary control device 60 employed in this invention can be had by reference to the copending applications of K. A. Oplinger, Serial No. 387,097, and Serial No. 387,098, filed April 5, 1941, and assigned to the assignee of this invention.

As illustrated, the primary control device 60 is carried by the bracket 70 which is mounted on the panel 72 as by means of the screw 74. A mechanical connection is also secured to the base of the bellows 68 for connecting a driving member thereto and actuating the bellows 68. As shown, a threaded rod 76 is secured at one end to the bellows 68, a connecting block 78 being adjustably mounted on the other end of the threaded rod 76 as by means of the nut 80.

A lever 82 is pivotally mounted at one end as by means of the leaf-spring 84 secured on the panel 72. As illustrated, the leaf-spring 84 forms the pivot for the lever 82 the leaf-spring being secured at one end to the block 86 carried on the panel 72 by the screw 85 and to lever 82 by screw 87. The lever 82 is connected to the connecting block 78 as by means of the leaf-spring member 88, the ends of which are secured to the connecting block 78 by means of the screw 90 and to the lever 82 by means of the screw 92 and the connecting block 94 which is carried by the lever. The lever 82 is disposed to actuate the bellows 68 as it is moved about its floating pivot 84. The free end of the lever 82 is of substantially U-shape and carries a roller 96 at its end suitably mounted as in ball bearings (not shown) for permitting substantially frictionless rotative movement of the roller.

Again referring to the arms 52 and 56 disposed for movement as the differential connection 32 is moved, the spacing between the arms is maintained by means of the shaft 98 disposed between and secured to the arms 52 and 56 near its upper end in any suitable manner illustrated in Fig. 2. The upper ends of the arms 52 and 56 are slotted in a manner similar to their lower ends for receiving a shaft 100 which extends therebetween. As illustrated in Fig. 2, the slotted end of the arm 56 is disposed to grip one end of the shaft 100, a wing nut 102 being disposed to be tightened on the bolt 104 which extends through the slotted end of the arm 56 to tighten the grip of the slotted end on the shaft 100 to prevent rotation of the shaft relative to the arms 52 and 56.

Again referring to Fig. 1, there is shown a cam 106 carried on the shaft 100, the cam being so disposed that its sloped surface engages the roller 96 carried by the lever 82. The angle of the sloped surface of the cam 106 relative to the roller 96 can be varied or adjusted by loosening the wing nut 102 illustrated in Fig. 2 and turning the shaft 100 by means of its handle 108. As will be understood, the adjustment of the angle of the sloped surface of the cam 106 will determine the ratio of movement of the lever 82 to the movement of the differential device 32 and consequently will determine the sensitivity of the operation of the primary control device 60 in response to a change in speed between the speeds of the motors 10 and 12.

This is quite evident when it is considered that the threads of the differential worm 50 and nut 46 normally have a pitch which will require three turns of the worm to operate the primary control device throughout its entire range of operation. By changing the angle of the sloped surface, the regulation can be so adjusted that one turn of the worm of the differential device 32 is sufficient to effect the operation of the primary control device 60 over its entire range of operation.

In operation, assuming that the motors 10 and 12 are operating at a desired speed and that the differential device has functioned to so operate the primary control device 60, that the column of mercury effectively shunts a number of the sections of the resistor 24 from the circuit with the field winding 16 of motor 10, if for any reason the speed of the motor 10 increases then operation of the differential device is effected. If at the moment that the speed of the motor 10 is increased, the cam 106 is in the position shown by the dotted lines in Fig. 1, the shafts 52 and 56 are actuated in a counterclockwise direction about their pivot 54 to cause the cam 106 to actuate the lever 82 in a clockwise direction about its floating pivot 84. This is readily apparent for as the cam 106 is moved in a counterclockwise direction, the roller 96 rides on its sloped surface and is forced upwardly to effect a movement of the lever 82.

The movement of the lever 82 about its pivot 84 in the clockwise direction applies a force to the bellows 68 to force the mercury upwardly through the well 66 to progressively bridge the conducting members 62 and to progressively shunt more of the sections of the resistor 24 from circuit with the field winding 16, thereby increasing the excitation of the field winding 16. The operation of the primary control device 60 is substantially instantaneous with the change in the speed of the motor 10 and is effective immediately to change the excitation to maintain the speed of the motor 10 substantially constant with respect to the speed reference machine 12.

If for any reason the speed of the motor 10 is decreased with respect to the speed of the constant reference machine 12, the differential control device 32 functions to actuate the arms 52 and 56 in a clockwise direction about their pivot 54 to permit the lever 82 to rotate counterclockwise about its pivot 84, the roller 96 carried on the end of the lever 82 rolling down the sloped surface of the cam 106. In practice, the spring 84 forming the pivot for the lever 82 will normally be so self-biased as to force the counterclockwise movement of the lever 82 about its pivot when the cam 106 is actuated in the clockwise direction from the position shown in Fig. 1. The movement of the lever 82 effectively applies a force to the bellows 68 to operate it to its extended position and cause the mercury in the well to progressively break the electrical contact between the conducting members 62 and to progressively connect additional sections of the resistor 24 in circuit with the field winding 16 of the motor 10. The insertion of the resistor sections of the resistor 24 effectively reduces the excitation of the field winding 16 to increase the speed of the motor 10 to the desired value.

The regulator of this invention is direct acting and effects a quick and sensitive regulation of the speed of the motor which it is desired to control with respect to the speed of a constant reference machine. Adjustments are provided for obtaining the desired sensitivity, the regulation being obtained with a minimum of apparatus and a minimum of moving elements. Further by employing the primary control device described very small changes in the number of sections of the resistor in circuit with the field winding is obtained since the primary control device may have a very large number of switching steps in a very short element, the high current capacity and its sealed-in contact structure making it desirable for use as described.

Although this invention has been described with reference to a particular embodiment thereof, it is, of course, not to be limited thereto except insofar as is necessitated by the scope of the appended claims.

I claim as my invention:

1. In a regulator, in combination, a constant speed reference machine, a dynamo-electric machine provided with a field winding to be regulated, means for controlling the excitation of the dynamo-electric machine, a differential connection responsive to the speeds of the constant speed reference machine and the dynamo-electric machine, and means disposed for movement as the differential moves to actuate the means for controlling the excitation of the dynamo-electric machine, said actuating means comprising an arm carried by the differential and disposed for movement through a predetermined arc as the differential moves, a member having a sloped surface carried by the arm and movable therewith, said member being adjustably mounted on the arm for changing the angle of its sloped surface, a pivotally mounted lever disposed to be engaged by the adjustable member carried by the arm and actuated about its pivot, and means for so connecting the lever to the means for controlling the excitation of the dynamo-electric machine that movement of the lever by the arm carried by the differential effects the operation of the control means, the angle of slope of the surface of the adjustable member carried by the arm determining the ratio of the movement of the lever to the movement of the differential and the sensitivity of the operation of the control device.

2. In a regulator, in combination, a constant speed reference machine, a dynamo-electric machine provided with a field winding to be regulated, means for controlling the excitation of the dynamo-electric machine, a differential connection responsive to the speeds of the constant speed reference machine and the dynamo electric machine, and means disposed for movement as the differential moves to actuate the means for controlling the excitation of the dynamo-electric machine, said actuating means comprising an arm carried by the differential and disposed for movement through a predetermined arc as the differential moves, a member having a sloped surface carried by the arm and movable therewith, said member being adjustably mounted on the arm for changing the angle of its sloped surface, a pivotally mounted lever disposed for movement about its pivot, means carried by the lever disposed to be engaged by the sloped surface and to move relative thereto as the arm is moved, the relative movement of the means carried by the lever effecting a movement of the lever about its pivot, and means for so connecting the lever to the means for controlling the excitation of the dynamo-electric machine that the movement of the lever effects the operation of the control means, the angle of slope of the sloped surface of the member carried by the arm determining the ratio of the movement of the lever to the movement of the differential and the sensitivity of the operation of the control device.

3. In a regulator, in combination, a constant speed reference machine, a dynamo-electric machine provided with a field winding to be regulated, means for controlling the excitation of the dynamo-electric machine, a differential connection responsive to the speed of the constant speed reference machine and the dynamo-electric machine, and means disposed for movement as the differential moves to actuate the means for controlling the excitation of the dynamo-electric machine, said actuating means comprising an arm carried by the differential and disposed for movement through a predetermined arc as the differential moves, a cam carried by the arm and movable therewith, the cam having a sloped surface, a pivotally mounted lever disposed for movement about its pivot, means carried by the lever disposed to be engaged by the sloped surface of the cam for movement relative thereto as the cam is moved, and means for so connecting the lever to the means for controlling the excitation of the dynamo-electric machine that movement of the lever effects the operation of the control means, the angle of slope of the sloped surface of the cam which engages the means carried by the lever determining the ratio of the movement of the lever to the movement of the differential.

4. In a regulator, in combination, a constant speed reference machine, a dynamo-electric machine provided with a field winding to be regulated, a resistor having a plurality of sections connected in circuit with the field winding of the dynamo-electric machine, a control device for controlling the number of sections of the resistor connected in circuit with the field winding, said control device comprising a plurality of alternately stacked conducting members and insulating spacer members provided with aligned openings therein for forming a well, the conducting members and spacer members being bonded together to form a leakproof structure, a bellows at one end of the stack disposed to communicate with the well therein, and liquid conducting material carried in the bellows, the liquid conducting material being disposed to be actuated by a movement of the bellows to flow in the well and progressively bridge the spaced conducting members to perform a switching operation, a differential connection responsive to the speeds of the constant speed reference machine and the dynamo-electric machine, and means disposed for movement as the differential moves to actuate the bellows and force the liquid conducting material carried therein to perform the switching operation and control the excitation of the dynamo-electric machine.

5. In a regulator, in combination, a constant speed reference machine, a dynamo-electric machine provided with a field winding to be regulated, a resistor having a plurality of sections connected in circuit with the field winding of the dynamo-electric machine, a control device for controlling the number of sections of the resistor connected in circuit with the field winding, said control device comprising a plurality of alternately stacked conducting members and insulating spacer members provided with aligned openings therein for forming a well, the conducting members and spacer members being bonded together to form a leakproof structure, a bellows at one end of the stack disposed to communicate with the well therein, and liquid conducting material carried in the bellows, the liquid conducting material being disposed to be actuated by a movement of the bellows to flow in the well and progressively bridge the spaced conducting members to perform a switching operation, a differential connection responsive to the speeds of the constant speed reference machine and the dynamo-electric machine, and means disposed for movement as the differential moves to actuate the bellows to effect a switching operation for controlling the excitation of the dynamo-electric machine, said actuating means comprising an arm carried by the differential and disposed for movement through a predetermined arc as the differential moves, a pivotally mounted lever disposed to be engaged by the arm and actuated about its pivot, and means for so connecting the lever to the bellows of the control device that movement of the lever by the arm carried by the differential effects the operation of the control device.

6. In a regulator, in combination, a constant speed reference machine, a dynamo-electric machine provided with a field winding to be regulated, a resistor having a plurality of sections connected in circuit with the field winding of the dynamo-electric machine, a control device for controlling the number of sections of the resistor connected in circuit with the field winding, said control device comprising a plurality of alternately stacked conducting members and insulating spacer members provided with aligned openings therein for forming a well, the conducting members and spacer members being bonded together to form a leakproof structure, a bellows at one end of the stack disposed to communicate with the well therein, and liquid conducting material carried in the bellows, the liquid conducting material being disposed to be actuated by a movement of the bellows to flow in the well and progressively bridge the spaced conducting members to perform a switching operation, a differential connection responsive to the speeds of the constant speed reference machine and the dynamo-electric machine, and means disposed for movement as the differential moves to actuate the bellows to effect a switching operation for controlling the excitation of the dynamo-electric machine, said actuating means comprising an arm carried by the differential and disposed for movement through a predetermined arc as the differential moves, a member having a sloped surface carried by the arm and movable therewith, said member being adjustably mounted for changing the angle of the sloped surface, a pivotally mounted lever disposed for movement about its pivot, means carried by the lever disposed to be engaged by the sloped surface as the arm is moved to effect a movement of the lever relative to the arm, and means for so connecting the lever to the bellows of the control device that movement of the lever effects the operation of the control device, the angle of slope of the sloped surface of the member carried by the arm determining the ratio of the movement of the lever to the movement of the differential and the sensitivity of the operation of the control device.

RALPH A. GEISELMAN.